(12) United States Patent
Yamashita et al.

(10) Patent No.: US 7,951,733 B2
(45) Date of Patent: May 31, 2011

(54) BLUE-VIOLET LIGHT BLOCKING GLASS

(75) Inventors: Naoto Yamashita, Osaka (JP); Kazuhisa Kimura, Osaka (JP); Tatsuya Suetsugu, Osaka (JP); Toshihiko Einishi, Osaka (JP); Kohei Kadono, Ikeda (JP)

(73) Assignees: Isuzu Glass Co., Ltd., Osaka-Shi (JP); National Institute of Advanced Industrial Science and Technology, Tokyo (JP)

( * ) Notice: Subject to any disclaimer, the term of this patent is extended or adjusted under 35 U.S.C. 154(b) by 395 days.

(21) Appl. No.: 12/084,765

(22) PCT Filed: Nov. 15, 2006

(86) PCT No.: PCT/JP2006/322706
§ 371 (c)(1),
(2), (4) Date: May 9, 2008

(87) PCT Pub. No.: WO2007/058185
PCT Pub. Date: May 24, 2007

(65) Prior Publication Data
US 2009/0163343 A1    Jun. 25, 2009

(30) Foreign Application Priority Data
Nov. 15, 2005  (JP) ................................ 2005-330697

(51) Int. Cl.
C03C 3/112    (2006.01)
C03C 3/089    (2006.01)
C03C 3/064    (2006.01)

(52) U.S. Cl. ................ 501/56; 501/13; 501/65; 501/66; 501/67; 501/77

(58) Field of Classification Search .............. 501/13, 501/32, 40, 56, 65, 66, 67, 77
See application file for complete search history.

(56) References Cited

U.S. PATENT DOCUMENTS

| | | | | |
|---|---|---|---|---|
| 3,208,860 A | | 9/1965 | Armistead et al. ............... | 106/54 |
| 4,018,965 A | * | 4/1977 | Kerko et al. ................... | 428/410 |
| 4,102,693 A | | 7/1978 | Owen ............................ | 106/54 |
| 4,686,196 A | | 8/1987 | Gliemeroth et al. ............ | 501/13 |
| 5,093,286 A | * | 3/1992 | Nogami et al. ................. | 501/17 |
| 5,275,979 A | | 1/1994 | Borrelli et al. ................. | 501/13 |
| 5,432,635 A | * | 7/1995 | Tanahashi et al. ............. | 359/326 |
| 5,534,041 A | | 7/1996 | Havens et al. ................. | 65/30.1 |
| 5,627,114 A | | 5/1997 | Havens et al. ................. | 501/56 |
| 6,162,749 A | * | 12/2000 | Brocheton et al. ............. | 501/13 |
| 7,547,652 B2 | * | 6/2009 | Zhang et al. ................... | 501/40 |
| 2003/0136152 A1 | | 7/2003 | Borrelli et al. ................. | 65/32.1 |
| 2005/0054512 A1 | * | 3/2005 | Brocheton et al. ............. | 501/56 |

FOREIGN PATENT DOCUMENTS

| | | | | |
|---|---|---|---|---|
| JP | 50056410 A | * | 5/1975 | |
| JP | 60264344 A | * | 12/1985 | |
| JP | 5-105865 | | 4/1993 | |
| JP | 6-191878 | | 7/1994 | |
| JP | 8-259261 | | 10/1996 | |
| JP | 2003-261357 | | 9/2003 | |
| WO | WO 02/36512 A1 | | 5/2002 | |
| WO | WO 2005005334 A1 | * | 1/2005 | |

OTHER PUBLICATIONS

Supplementary European Search Report dated Dec. 18, 2009.

* cited by examiner

*Primary Examiner* — Karl E Group
*Assistant Examiner* — Elizabeth A Bolden
(74) *Attorney, Agent, or Firm* — Kratz, Quintos & Hanson, LLP

(57) ABSTRACT

The present invention provides a blue-violet light blocking glass containing copper (I) halide fine particles that satisfactorily transmits light having a wavelength of 450 nm to 600 nm and sharply blocks light having a wavelength shorter than 450 nm. Specifically, the present invention provides a blue-violet light blocking glass containing a copper (I) halide and silver; for example, 20 to 85% by weight of $SiO_2$; 2 to 75% by weight of $B_2O_3$; not more than 10% by weight of $Al_2O_3$; 2 to 30% by weight of at least one member selected from the group consisting of $Li_2O$, $Na_2O$, $K_2O$, $Rb_2O$ and $Cs_2O$; 1 to 15% by weight of at least one member selected from the group consisting of MgO, CaO, SrO, BaO and ZnO; not more than 10% by weight of at least one member selected from the group consisting of PbO, $Nb_2O_5$, $ZrO_2$, $La_2O_3$, $Y_2O_3$, $Ta_2O_3$ and $Gd_2O_3$; not more than 5% by weight of at least one member selected from the group consisting of $Sb_2O_3$ and $As_2O_3$; not more than 5% by weight of $SnO_2$; 0.01 to 10% by weight of a copper (I) halide; and 0.001 to 1% by weight of silver calculated on a metal basis.

16 Claims, 1 Drawing Sheet

[Fig.1]
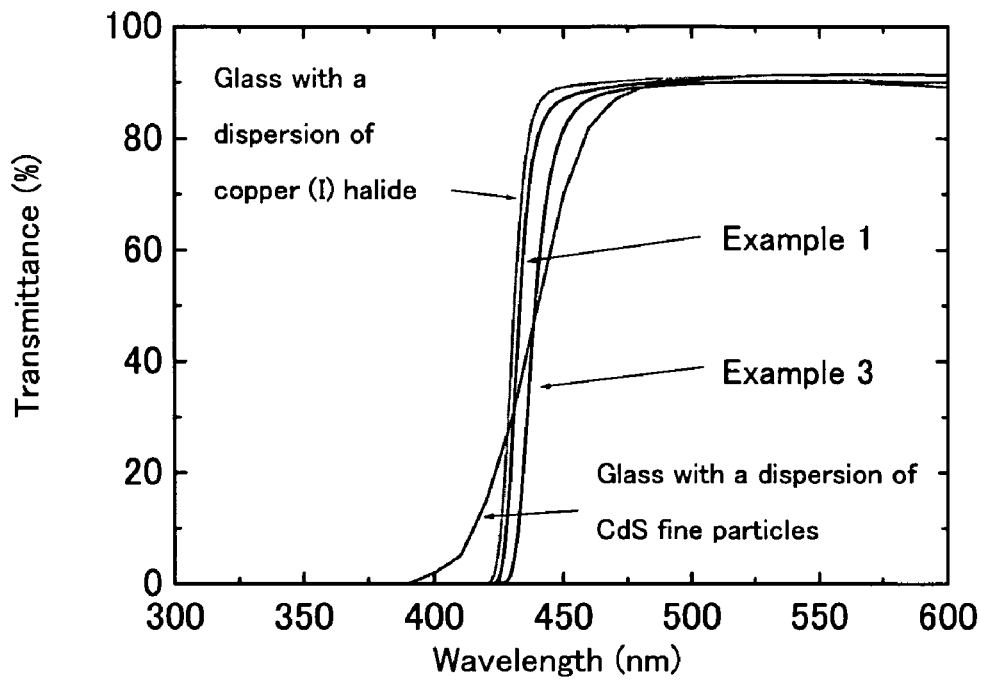
[Fig.2]
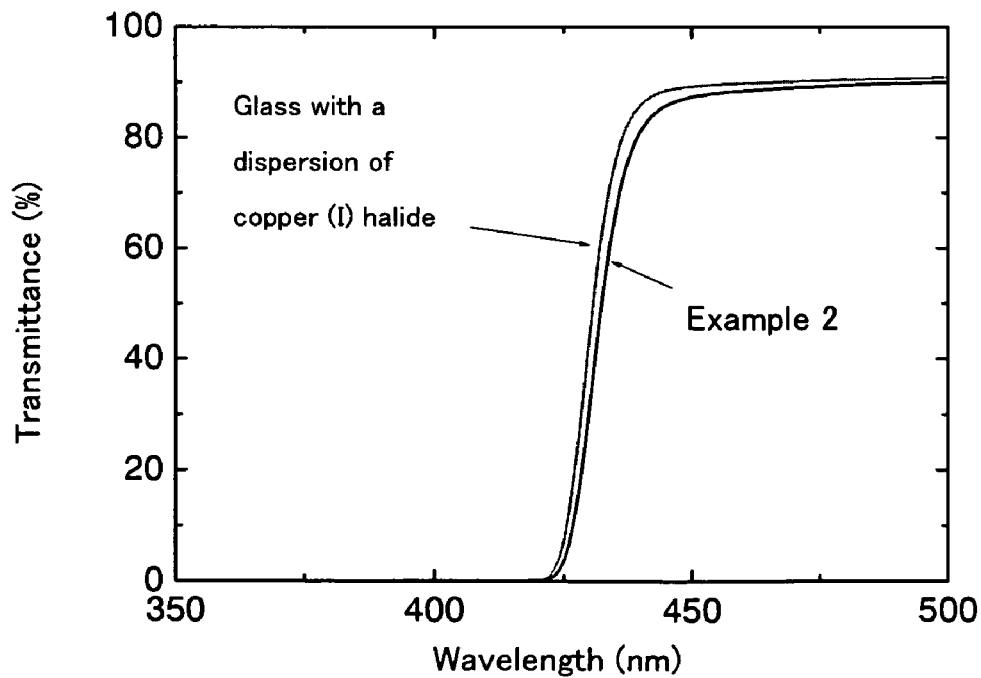

US 7,951,733 B2

BLUE-VIOLET LIGHT BLOCKING GLASS

TECHNICAL FIELD

The present invention relates to a blue-violet light blocking glass.

BACKGROUND ART

Methods for blocking light using glass can be roughly divided into two groups, i.e., interference methods and absorption methods.

In the interference methods, a multilayer film is deposited on glass that does not absorb UV or visible light. By utilizing the light interference ability of the multilayer film, light in a certain wavelength range can be blocked.

The interference-type light blocking method is dependent on incidental angle. Therefore, light in a certain wavelength range that enters the glass perpendicularly can be blocked, but light that is incident from other angles cannot be blocked. Furthermore, a sharp blocking effect is difficult to obtain by the interference-type light blocking method due to its wide gradient wavelength range ($\Delta\lambda$), as defined by JIS B 7113.

In the absorption-type light blocking method, light having a wavelength in a certain range is blocked by using glass that contains light-absorbing ions, metal colloids, semiconductor fine particles and the like. In particular, semiconductor fine particles have excellent absorption ability.

Examples of known semiconductor fine particles include II-VI compound semiconductors, such as crystals of CdS, CdSe, CdSSe and like cadmium compounds. However, because cadmium compounds are toxic, they may impair the operator's health during batch mixing, transporting, melting and other steps. Furthermore, this method requires treating cadmium compounds contained in wastewater and waste material, which are generated during cutting, grinding, polishing and like glass-processing steps. Although some of the glass that contains the above-mentioned cadmium compounds has a wavelength of not less than 450 nm at a transmittance of 50%, it has a wide gradient wavelength range ($\Delta\lambda$), and therefore it is difficult to obtain a sharp blocking effect just as in the interference-type light blocking method.

A light-blocking technique by which light in a specific wavelength range can be absorbed by replacing the cadmium compound with Zn fine particles is disclosed in, for example, Patent Document 1. However, the light-blocking technique disclosed in Patent Document 1 still has a wide gradient wavelength range ($\Delta\lambda$), and therefore it is difficult to obtain a sharp blocking effect.

Ultraviolet-ray blocking glass and colored glass using copper (I) halide fine particles as group I-VII semiconductors, as semiconductor fine particles, are also known (Patent Documents 2 to 8).

Examples of copper (I) halide fine particles include fine particles of CuCl, CuBr, CuI and like compounds, and mixtures thereof. These copper (I) halide fine particles are not toxic and are easy to handle. The ultraviolet-ray blocking glass and colored glass containing such fine particles exhibit a narrow gradient wavelength range ($\Delta\lambda$) and achieve a sharp blocking effect.

However, when a high transmittance of visible light is desired in the glass that contains copper (I) halide fine particles described above (for example, when an average transmittance of not less than 85% at a wavelength in the range of 450 nm to 600 nm is desired from light having a wavelength in the range of 300 nm to 600 nm incident on a 1-mm-thick glass plate), since a transmittance of 50% is obtained at a maximum wavelength of 430 nm, even after adjusting the compositions and contents of the fine particles therein, longer-wavelength light, i.e., 430 nm to 450 nm, cannot be satisfactorily blocked. Therefore, the development of a light-blocking technique by which sharp blocking can be attained for wavelengths at around 450 nm is desired.

Patent Document 1: Japanese Unexamined Patent Publication No. 2005-206434
Patent Document 2: Japanese Unexamined Patent Publication No. 1992-018501
Patent Document 3: Japanese Unexamined Patent Publication No. 1992-275942
Patent Document 4: Japanese Unexamined Patent Publication No. 1993-105865
Patent Document 5: Japanese Unexamined Patent Publication No. 1993-201746
Patent Document 6: Japanese Unexamined Patent Publication No. 1994-024794
Patent Document 7: Japanese Unexamined Patent Publication No. 1995-048140
Patent Document 8: Japanese Unexamined Patent Publication No. 1996-337433

DISCLOSURE OF THE INVENTION

Problem to Be Solved by the Invention

An object of the present invention is to provide a blue-violet light blocking glass that contains copper (I) halide fine particles, satisfactorily transmits light having a wavelength of 450 nm to 600 nm, and sharply blocks light having a wavelength of less than 450 nm.

Means for Solving the Problem

The present inventors conducted extensive studies to achieve the above object, and found that it can be achieved when the glass contains silver in addition to copper (I) halide fine particles.

The present invention relates to the blue-violet light blocking glass described below.

Item 1. A blue-violet light blocking glass comprising a copper (I) halide and silver.

Item 2. A blue-violet light blocking glass according to Item 1, which further comprises 20 to 85% by weight of $SiO_2$; 2 to 75% by weight of $B_2O_3$; not more than 10% by weight of $Al_2O_3$; 2 to 30% by weight of at least one member selected from the group consisting of $Li_2O$, $Na_2O$, $K_2O$, $Rb_2O$ and $Cs_2O$; 1 to 15% by weight of at least one member selected from the group consisting of MgO, CaO, SrO, BaO and ZnO; not more than 10% by weight of at least one member selected from the group consisting of PbO, $Nb_2O_5$, $ZrO_2$, $La_2O_3$, $Y_2O_3$, $Ta_2O_3$ and $Gd_2O_3$; not more than 5% by weight of at least one member selected from the group consisting of $Sb_2O_3$ and $As_2O_3$; not more than 5% by weight of $SnO_2$; 0.01 to 10% by weight of a copper (I) halide; and 0.001 to 1% by weight of silver calculated on a metal basis.

Item 3. A blue-violet light blocking glass according to Item 1, which further comprises 20 to 85% by weight of $SiO_2$; 2 to 75% by weight of $B_2O_3$; not more than 10% by weight of $Al_2O_3$; 2 to 30% by weight of at least one member selected from the group consisting of $Li_2O$, $Na_2O$, $K_2O$, $Rb_2O$ and $Cs_2O$; 1 to 15% by weight of at least one member selected from the group consisting of MgO, CaO, SrO, BaO and ZnO; not more than 10% by weight of at least one member selected from the group consisting of PbO, $Nb_2O_5$, $ZrO_2$, $La_2O_3$, $Y_2O_3$, $Ta_2O_3$ and $Gd_2O_3$; not more than 5% by weight of at least one member selected from the group consisting of $Sb_2O_3$ and $As_2O_3$; not more than 5% by weight of $SnO_2$; 0.005 to 7% by weight of CuBr and 0.005 to 7% by weight of CuI, whose total amount is 0.01 to 10% by weight; and 0.001 to 1% by weight of silver calculated on a metal basis.

Item 4. A blue-violet light blocking glass according to Item 1, which further comprises 40 to 82% by weight of $SiO_2$; 12 to 52% by weight of $B_2O_3$; not more than 10% by weight of $Al_2O_3$; 2 to 20% by weight of at least one member selected from the group consisting of $Li_2O$, $Na_2O$, $K_2O$, $Rb_2O$ and $Cs_2O$; 1 to 15% by weight of at least one member selected from the group consisting of MgO, CaO, SrO, BaO and ZnO; not more than 10% by weight of at least one member selected from the group consisting of PbO, $Nb_2O_5$, $ZrO_2$, $La_2O_3$, $Y_2O_3$, $Ta_2O_3$ and $Gd_2O_3$; not more than 5% by weight of $SnO_2$; 0.01 to 10% by weight of at least one member selected from the group consisting of CuCl, CuBr and CuI; and 0.01 to 1% by weight of silver calculated on a metal basis.

Item 5. A blue-violet light blocking glass according to Item 1, which further comprises 40 to 82% by weight of $SiO_2$; 12 to 52% by weight of $B_2O_3$; not more than 10% by weight of $Al_2O_3$; 2 to 20% by weight of at least one member selected from the group consisting of $Li_2O$, $Na_2O$, $K_2O$, $Rb_2O$ and $Cs_2O$; 1 to 15% by weight of at least one member selected from the group consisting of MgO, CaO, SrO, BaO and ZnO; not more than 10% by weight of at least one member selected from the group consisting of PbO, $Nb_2O_5$, $ZrO_2$, $La_2O_3$, $Y_2O_3$, $Ta_2O_3$ and $Gd_2O_3$; not more than 5% by weight of at least one member selected from the group consisting of $Sb_2O_3$ and $As_2O_3$; not more than 5% by weight of $SnO_2$; 0.005 to 7% by weight of CuBr and 0.005 to 7% by weight CuI, whose total amount is 0.01 to 10% by weight; and 0.01 to 1% by weight of silver calculated on a metal basis.

Item 6. A blue-violet light blocking glass according to Item 2, which further comprises:

a glass substrate containing 1) $SiO_2$; 2) $B_2O_3$; 3) $Al_2O_3$; 4) at least one member selected from the group consisting of $Li_2O$, $Na_2O$, $K_2O$, $Rb_2O$ and $Cs_2O$; 5) at least one member selected from the group consisting of MgO, CaO, SrO, BaO and ZnO; 6) at least one member selected from the group consisting of PbO, $Nb_2O_5$, $ZrO_2$, $La_2O_3$, $Y_2O_3$, $Ta_2O_3$ and $Gd_2O_3$; 7) at least one member selected from the group consisting of $Sb_2O_3$ and $As_2O_3$; 8) $SnO_2$; 9) a copper (I) halide; and at least one member selected from the group consisting of silver ions and silver compounds formed in the glass substrate by diffusing silver ions.

Item 7. A blue-violet light blocking glass according to Item 3, which further comprises:

a glass substrate containing 1) $SiO_2$; 2) $B_2O_3$; 3) $Al_2O_3$; 4) at least one member selected from the group consisting of $Li_2O$, $Na_2O$, $K_2O$, $Rb_2O$ and $Cs_2O$; 5) at least one member selected from the group consisting of MgO, CaO, SrO, BaO and ZnO; 6) at least one member selected from the group consisting of PbO, $Nb_2O_5$, $ZrO_2$, $La_2O_3$, $Y_2O_3$, $Ta_2O_3$ and $Gd_2O_3$; 7) at least one member selected from the group consisting of $Sb_2O_3$ and $As_2O_3$; 8) $SnO_2$; 9) CuBr and CuI; and at least one member selected from the group consisting of silver ions and silver compounds formed in the glass substrate by diffusing silver ions.

Item 8. A blue-violet light blocking glass according to Item 4, which further comprises:

a glass substrate containing 1) $SiO_2$; 2) $B_2O_3$; 3) $Al_2O_3$; 4) at least one member selected from the group consisting of $Li_2O$, $Na_2O$, $K_2O$, $Rb_2O$ and $Cs_2O$; 5) at least one member selected from the group consisting of MgO, CaO, SrO, BaO and ZnO; 6) at least one member selected from the group consisting of PbO, $Nb_2O_5$, $ZrO_2$, $La_2O_3$, $Y_2O_3$, $Ta_2O_3$ and $Gd_2O_3$; 7) at least one member selected from the group consisting of $Sb_2O_3$ and $As_2O_3$; 8) $SnO_2$; 9) at least one member selected from the group consisting of Cl, Br and I; 10) 0.01 to 1% by weight of silver calculated on a metal basis; and at least one copper (I) halide selected from the group consisting of CuCl, CuBr and CuI formed in the glass substrate by diffusing copper ions.

Item 9. A blue-violet light blocking glass according to Item 5, which further comprises:

a glass substrate containing 1) $SiO_2$; 2) $B_2O_3$; 3) $Al_2O_3$; 4) at least one member selected from the group consisting of $Li_2O$, $Na_2O$, $K_2O$, $Rb_2O$ and $Cs_2O$; 5) at least one member selected from the group consisting of MgO, CaO, SrO, BaO and ZnO; 6) at least one member selected from the group consisting of PbO, $Nb_2O_5$, $ZrO_2$, $La_2O_3$, $Y_2O_3$, $Ta_2O_3$ and $Gd_2O_3$; 7) at least one member selected from the group consisting of $Sb_2O_3$ and $As_2O_3$; 7) $SnO_2$; 8) Br and I; 9) 0.01 to 1% by weight of silver calculated on a metal basis; and CuBr and CuI in the glass substrate formed by diffusing copper ions in the glass substrate.

Item 10. A blue-violet light blocking glass according to Item 4, which further comprises:

a glass substrate containing 1) $SiO_2$; 2) $B_2O_3$; 3) $Al_2O_3$; 4) at least one member selected from the group consisting of $Li_2O$, $Na_2O$, $K_2O$, $Rb_2O$ and $Cs_2O$; 5) at least one member selected from the group consisting of MgO, CaO, SrO, BaO and ZnO; 6) at least one member selected from the group consisting of PbO, $Nb_2O_5$, $ZrO_2$, $La_2O_3$, $Y_2O_3$, $Ta_2O_3$ and $Gd_2O_3$; 7) at least one member selected from the group consisting of $Sb_2O_3$ and $As_2O_3$; 8) $SnO_2$; 9) at least one member selected from the group consisting of Cl, Br and I; and at least one member selected from the group consisting of silver ions and silver compounds and at least one copper (I) halide selected from the group consisting of CuCl, CuBr and CuI obtained by diffusing silver ions and copper ions into the glass substrate.

Item 11. A blue-violet light blocking glass according to Item 5, which further comprises:

a glass substrate containing 1) $SiO_2$; 2) $B_2O_3$; 3) $Al_2O_3$; 4) at least one member selected from the group consisting of $Li_2O$, $Na_2O$, $K_2O$, $Rb_2O$ and $Cs_2O$; 5) at least one member selected from the group consisting of MgO, CaO, SrO, BaO and ZnO; 6) at least one member selected from the group consisting of PbO, $Nb_2O_5$, $ZrO_2$, $La_2O_3$, $Y_2O_3$, $Ta_2O_3$ and $Gd_2O_3$; 7) at least one member selected from the group consisting of $Sb_2O_3$ and $As_2O_3$; 7) $SnO_2$; 8) Br and I; and at least one member selected from the group consisting of silver ions and silver compounds, and at least one copper (I) halide selected from the group consisting of CuCl, CuBr and CuI obtained by diffusing silver ions and copper ions in the glass substrate.

Item 12. A blue-violet light blocking glass according to Item 1, wherein when light having a wavelength of 300 nm to 600 nm is incident in the glass having a thickness of 1 mm, the average transmittance of light having a wavelength of 450 nm to 600 nm is not less than 85%, and the wavelength that achieves a transmittance of 50% is not less than 432 nm.

Item 13. A blue-violet light blocking glass according to Item 1, which is used for protecting a liquid crystal display.

Item 14. A blue-violet light blocking glass according to Item 1, which is for use in window glass.

Item 15. A blue-violet light blocking glass according to Item 1, which is at least one member selected from the group consisting of materials for an optical filter, a light filter, and a lens.

Item 16. A blue-violet light blocking glass according to Item 1, which is for use in eyeglasses.

Item 17. A blue-violet light blocking glass according to Item 1, which is a material for an ultraviolet absorbent powder.

The blue-violet light blocking glass of the present invention is explained in detail below.

Blue-Violet Light Blocking Glass

The blue-violet light blocking glass of the present invention achieves an absorption type light blocking ability, and comprises silver in addition to copper (I) halide fine particles.

The blue-violet light blocking glass of the present invention comprises silver in addition to copper (I) halide fine particles. Therefore, it can satisfactorily transmit light having a wavelength of 450 nm to 600 nm, and sharply block light having a wavelength shorter than 450 nm. Specifically, in the Best Mode for Carrying out the Invention, when light having a wavelength of 300 nm to 600 nm is incident on a 1-mm-thick glass plate (from the direction perpendicular to the surface of the glass plate), the average transmittance of light having a wavelength of 450 nm to 600 nm is not less than 85%, and a transmittance of 50% is obtained at the wavelength of not less than 432 nm. In other words, the blue-violet light blocking glass of the present invention has excellent transmittance for light having a wavelength of 450 nm to 600 nm and a sharper blocking ability (i.e., a narrower gradient wavelength range: Δλ) compared to prior-art glass. In the present specification, Δλ indicates the gradient wavelength range as defined by JIS B 7113.

Because the blue-violet light blocking glass of the present invention does not contain a cadmium compound, it is safer and its production and disposal is easier than known products.

There are no limitations to the materials for the blue-violet light blocking glass of the present invention other than the copper (I) halide and silver, and conventional materials for glass can be used. Examples of usable materials include $SiO_2$, $B_2O_3$, $Al_2O_3$, $Li_2O$, $Na_2O$, $K_2O$, $Rb_2O$, $Cs_2O$, MgO, CaO, SrO, BaO, ZnO, PbO, $Nb_2O_5$, $ZrO_2$, $La_2O_3$, $Y_2O_3$, $Ta_2O_3$, $Gd_2O_3$, $Sb_2O_3$, $As_2O_3$, $SnO_2$, etc.

Examples of preferable compositions of the blue-violet light blocking glass of the present invention are as described below.

Composition 1

A blue-violet light blocking glass comprising 20 to 85% by weight of $SiO_2$; 2 to 75% by weight of $B_2O_3$; not more than 10% by weight of $Al_2O_3$; 2 to 30% by weight of at least one member selected from the group consisting of $Li_2O$, $Na_2O$, $K_2O$, $Rb_2O$ and $Cs_2O$; 1 to 15% by weight of at least one member selected from the group consisting of MgO, CaO, SrO, BaO and ZnO; not more than 10% by weight of at least one member selected from the group consisting of PbO, $Nb_2O_5$, $ZrO_2$, $La_2O_3$, $Y_2O_3$, $Ta_2O_3$ and $Gd_2O_3$; not more than 5% by weight of at least one member selected from the group consisting of $Sb_2O_3$ and $As_2O_3$; not more than 5% by weight of $SnO_2$; 0.01 to 10% by weight of copper (I) halide; and 0.001 to 1% by weight of silver calculated on a metal basis.

Oxide compositions are shown for metals from Si to Sn (this is also true for the following compositions).

Composition 2

A blue-violet light blocking glass comprising 20 to 85% by weight of $SiO_2$; 2 to 75% by weight of $B_2O_3$; not more than 10% by weight of $Al_2O_3$; 2 to 30% by weight of at least one member selected from the group consisting of $Li_2O$, $Na_2O$, $K_2O$, $Rb_2O$ and $Cs_2O$; 1 to 15% by weight of at least one member selected from the group consisting of MgO, CaO, SrO, BaO and ZnO; not more than 10% by weight of at least one member selected from the group consisting of PbO, $Nb_2O_5$, $ZrO_2$, $La_2O_3$, $Y_2O_3$, $Ta_2O_3$ and $Gd_2O_3$; not more than 5% by weight of at least one member selected from the group consisting of $Sb_2O_3$ and $As_2O_3$; not more than 5% by weight of $SnO_2$; 0.005 to 7% by weight of CuBr and 0.005 to 7% by weight of CuI, whose total amount is 0.01 to 10% by weight; and 0.001 to 1% by weight of silver calculated on a metal basis.

Composition 3: Preferable Modification of Composition 1

A blue-violet light blocking glass comprising 40 to 82% by weight of $SiO_2$; 12 to 52% by weight of $B_2O_3$; not more than 10% by weight of $Al_2O_3$; 2 to 20% by weight of at least one member selected from the group consisting of $Li_2O$, $Na_2O$, $K_2O$, $Rb_2O$ and $Cs_2O$; 1 to 15% by weight of at least one member selected from the group consisting of MgO, CaO, SrO, BaO and ZnO; not more than 10% by weight of at least one member selected from the group consisting of PbO, $Nb_2O_5$, $ZrO_2$, $La_2O_3$, $Y_2O_3$, $Ta_2O_3$ and $Gd_2O_3$; not more than 5% by weight of at least one member selected from the group consisting of $Sb_2O_3$ and $As_2O_3$; not more than 5% by weight of $SnO_2$; 0.01 to 10% by weight of at least one member selected from the group consisting of CuCl, CuBr and CuI; and 0.01 to 1% by weight of silver calculated on a metal basis.

Composition 4: Preferable Modification of Composition 2

A blue-violet light blocking glass comprising 40 to 82% by weight of $SiO_2$; 12 to 52% by weight of $B_2O_3$; not more than 10% by weight of $Al_2O_3$; 2 to 20% by weight of at least one member selected from the group consisting of $Li_2O$, $Na_2O$, $K_2O$, $Rb_2O$ and $Cs_2O$; 1 to 15% by weight of at least one member selected from the group consisting of MgO, CaO, SrO, BaO and ZnO; not more than 10% by weight of at least one member selected from the group consisting of PbO, $Nb_2O_5$, $ZrO_2$, $La_2O_3$, $Y_2O_3$, $Ta_2O_3$ and $Gd_2O_3$; not more than 5% by weight of at least one member selected from the group consisting of $Sb_2O_3$ and $As_2O_3$; not more than 5% by weight of $SnO_2$; 0.005 to 7% by weight of CuBr; 0.005 to 7% by weight of CuI, whose total amount is 0.01 to 10% by weight; and 0.01 to 1% by weight of silver calculated on a metal basis.

In a multicomponent glass material, each component influences each other to determine the characteristics of the glass material. Therefore, it is not always appropriate to specify a quantitative range for each component based on the characteristics of the component; however, the reasons why the preferable ranges for the components are specified in the above preferable composition examples are described below.

$SiO_2$ is the main component for forming a glass network. The content of $SiO_2$ is preferably about 20% by weight to about 85% by weight and more preferably about 40% by weight to about 82% by weight. If the content of $SiO_2$ exceeds 85% by weight, the fusibility of the glass may be lowered. If the content of $SiO_2$ is below 20% by weight, its chemical durability may be insufficient and this may cause a change in color.

$B_2O_3$ can increase the fusibility of glass. In specific compositions, $B_2O_3$ functions as a component for forming glass networks. The content of $B_2O_3$ is preferably about 2% by weight to about 75% by weight, and more preferably about 12% by weight to about 52% by weight. If the content of $B_2O_3$ exceeds 75% by weight, the chemical durability of the glass may be insufficient. If the content of $B_2O_3$ is below 2% by weight, the light transmittance and fusibility of the glass may be insufficient.

$Al_2O_3$ can suppress the devitrification of glass and improve its chemical durability. The content of $Al_2O_3$ is preferably not more than 10% by weight. There is no particular lower limitation to the $Al_2O_3$ content; however, in order to obtain desirable effects, it is preferably not less than 1% by weight. If the content of $Al_2O_3$ exceeds 10% by weight, the fusibility of the glass may be lowered.

$Li_2O$, $Na_2O$, $K_2O$, $Rb_2O$ and $Cs_2O$ can improve the fusibility of glass. These components may be used singly or in combination. The total content of these components is preferably about 2% by weight to about 30% by weight, and more preferably about 2% by weight to about 20% by weight. If the content of these components exceeds 30% by weight, the chemical durability of the glass may be unsatisfactory. If the content thereof is below 2% by weight, the fusibility of the glass may be unsatisfactory.

MgO, CaO, SrO, BaO and ZnO can improve the chemical durability of glass. These components may be used singly or in combination. The total content of these components is preferably about 1% by weight to about 15% by weight, and more preferably about 1% by weight to about 10% by weight. If the content exceeds 15% by weight, the fusibility of the glass may be lowered. If the content is below 1% by weight, the chemical durability of the glass may be insufficient.

PbO, $Nb_2O_5$, $ZrO_2$, $La_2O_3$, $Y_2O_3$, $Ta_2O_3$ and $Gd_2O_3$ can improve the chemical durability of glass. These components may be used singly or in combination. The total content of these components is preferably not more than 10% by weight. There is no particular lower limitation to the content thereof; however, in order to obtain desirable effects, it is preferably not less than 1% by weight. If the content thereof exceeds 10% by weight, the fusibility of the glass may be lowered.

$Sb_2O_3$ and $As_2O_3$ function as glass clarifiers. These components may be used singly or in combination. The total content of these components is preferably not more than 5% by weight. There is no particular lower limitation to the content thereof; however, in order to obtain desirable effects, it is not less than 0.05% by weight. If the content thereof exceeds 5% by weight, the fusibility of the glass may be lowered.

The content of $SnO_2$ is preferably not more than 5% by weight. Similar to Al, Zn, and like metals, and sucrose, urea, and like organics, Sn functions as a reducing agent when glass is melted. In other words, Sn reduces copper components to monovalent ($Cu^+$) while melting glass. There is no particular lower limitation to the $SnO_2$ content; however, in order to obtain desirable effects, it is desirably not less than 0.02% by weight. If the content of $SnO_2$ is lower than 5% by weight, copper is undesirably deposited in the glass.

There are no limitations to the copper (I) halides, and usable examples thereof include CuCl, CuBr, CuI, etc. These copper (I) halides may be used singly or in combination. Copper halide functions as a coloring agent, which absorbs light having a wavelength in the range of ultraviolet to visible light. The copper (I) halide content is preferably about 0.01% by weight to about 10% by weight, and more preferably about 0.3% by weight to about 8% by weight. When two or more kinds of copper (I) halides are used, the combination of CuBr and CuI is preferable. To be more specific, the total content of copper (I) halide is preferably 0.01% by weight to 10% by weight, while the content of CuBr is preferably 0.005% by weight to 7% by weight and that of CuI is 0.005% by weight to 7% by weight.

By controlling the content of copper (I) halide in the glass so as to fall within the above range, it is possible to almost completely block light having a wavelength not greater than 420 nm, almost completely transmit light having a wavelength greater than 420 nm, and obtain sharp absorption characteristics having a narrow gradient wavelength range ($\Delta\lambda$). If the content of copper halide is less than 0.01% by weight, it becomes difficult to obtain the desired effects. If the content of copper halide exceeds 10% by weight, the glass may be easily devitrified.

Copper (I) halides exist in glass in the form of crystal fine particles. There is no limitation to the size of the crystal fine particles, but the average particle diameter is generally about 0.1 nm to about 10 nm.

The blue-violet light blocking glass of the present invention contains silver in addition to the above described components. The addition of silver makes it possible to block light having a long wavelength. In other words, while maintaining high transmittance at the wavelength range of 450 nm to 600 nm, it is possible to block light having a wavelength in the vicinity of, but less than, 450 nm.

The content of silver in the total metal amount is preferably about 0.001% by weight to about 1% by weight, more preferably about 0.01% by weight to about 1% by weight, and still more preferably abut 0.03% by weight to about 0.08% by weight. If the content of silver becomes less than 0.001% by weight, it becomes difficult to obtain the desired effects. If the content of silver exceeds 1% by weight, silver may be deposited in the glass.

The silver exists in the glass in at least one of the forms of silver ions, silver fine particles or halogenated silver fine particles. There is no limitation to the size of the fine particles (including crystal fine particles), but the average particle diameter is about 0.1 nm to about 10 nm.

There are no limitations to the usages of the blue-violet light blocking glass of the present invention, and examples thereof include the following.

(1) Glass for Protecting Liquid Crystal Display Panel

Not only visible rays but also ultraviolet rays are emitted from the backlight of a liquid crystal display panel. In order to protect the eyes of a user viewing the emitted light, and to prevent degradation of the liquid crystal, it is preferable that the ultraviolet rays be eliminated.

The blue-violet light blocking glass of the present invention can also be used as a glass material for protecting liquid crystal display panels. In other words, by providing a protective panel formed from the glass in front or on back of the liquid crystal display panel, the ultraviolet rays emitted from the backlight can be selectively and sharply blocked. Specifically, when the protective panel is provided on the back of the liquid crystal display panel, ultraviolet rays in the light emitted from the backlight are eliminated before irradiating the liquid crystal, thus preventing liquid crystal degradation and protecting the eyes of the user. If the protective panel is placed in front of the liquid crystal display panel, it helps to protect the eyes of the user.

(2) Window Glass Material

Float glass has been conventionally used in the display cases of fine-art-and-craft shops and high-class clothing shops; window glass in various types of laboratories; window glass in automobiles; etc. However, float glass is not suitable for blocking the ultraviolet rays of sunlight. This can result in fading and deterioration of arts and crafts items, discoloration and deterioration of clothing, adverse affects on various studies conducted in laboratories, changes in quality and deterioration of automotive interior trim, etc. For automobile drivers and passengers, the ultraviolet rays can cause eye problems, skin disorders such as sunburn, etc.

The blue-violet light blocking glass of the present invention can also be used as a window glass material. In other words, by forming exterior glass and window glass from the glass of the present invention, the ultraviolet rays in sunlight can be selectively and sharply blocked, and visible light can be selectively transmitted. Accordingly, the use of the blue-violet light blocking glass of the present invention can solve or alleviate the above-described problems.

(3) Optical Filter, Light Filter, and Lens Materials

Optical filters, light filters, and lenses are conventionally used in cameras and like optical instruments. These components help to obtain clear images and the like by increasing ultraviolet blocking efficiency.

Because the blue-violet light blocking glass of the present invention can selectively and sharply block ultraviolet rays, it can be used as a material for optical filters, light filters, and lenses, which are advantageously used to obtain clear images, etc.

(4) Eyeglass Lenses

In order to protect the eyes of people wearing eyeglasses, it is desirable that the eyeglass lens be able to block ultraviolet rays contained in sunlight and like types of emitted light.

The blue-violet light blocking glass of the present invention can be used as a material for eyeglass lenses, as it can selectively and sharply block ultraviolet rays.

(5) Material for Ultraviolet Absorbent Powders

The blue-violet light blocking glass of the present invention can be used as a material for ultraviolet absorbents in powder form, as it can selectively and sharply block ultraviolet rays. The ultraviolet absorbent may be used in a combination of other ultraviolet absorbents. There is no limitation to the average particle diameter of the powder, but it is preferably about 1 μm to about 10 μm. Specifically, the blue-violet light blocking glass of the present invention can provide an ultraviolet absorption ability to resin products, coated films, etc., to improve the weather resistance and fading resistance thereof by adding it to resin compositions, coating compositions, etc., in powder form.

(6) Material for Glass Used in Facilities for Curing Ultraviolet-Curing Resin

When an ultraviolet-curing resin is cured, a light source that can emit high-energy ultraviolet rays, such as a high-pressure mercury lamp, metal halide lamp, or the like, is used. Such high-energy ultraviolet rays are necessary for curing resin, but exposure to ultraviolet rays should be limited only to the necessary site so as to secure safety for operators, prevent deterioration of the facilities, etc.

The blue-violet light blocking glass of the present invention can be used as a glass material for monitoring windows in such curing facilities. By using the blue-violet light blocking glass of the present invention as a glass material for monitoring windows, the operator's eyes can reliably be protected. If the glass is used to cover these facilities, the deterioration of the facilities can be prevented.

Method for Producing Blue-Violet Light Blocking Glass

There are no limitations to the methods for producing the blue-violet light blocking glass of the present invention. The blue-violet light blocking glass of the present invention can be produced by mixing the materials in the above-described ratio and employing a known method for producing glass.

There are no limitations to the materials for each component in the glass (glass material), and usable examples thereof include oxides, carbonates, sulfates, nitrate, hydroxide and like metals.

Examples of the materials for a copper (I) halide include, in addition to copper halides, mixtures of copper sources and halogen sources. Examples of copper sources include copper oxides, copper halides, etc. Examples of halogen sources include lithium halide, sodium halide, potassium halide, rubidium halide, caesium halide and like alkali halide compounds.

Examples of materials for silver include metal silver, silver oxides, silver halides, silver sulfates, silver nitrates, etc.

The blue-violet light blocking glass can be produced by, for example, mixing the above-mentioned materials in such a manner that the final product has the predetermined composition. The mixed materials are melted at a temperature of about 1200° C. to about 1500° C., stirred, clarified, and then poured into a mold. After or while cooling, the mixture is subjected to a heat treatment at a temperature of about 450° C. to about 700° C. for about 0.1 hour to about 5 hours, followed by cutting, grinding, etc.

A neutral or reducing atmosphere is preferable in the melting step so that the copper material becomes $Cu^+$. Examples of usable reducing agents include Sn, Al, Zn and like metals (including compounds thereof), and sucrose, urea and like organic substances.

In the cooling and heating process, it is preferable that the temperature be controlled so that the glass is free from distortion caused by heat. The cooling rate is preferably about 10° C./hr to about 100° C./hr, and more preferably about 30° C./hr to about 50° C./hr. The heating rate is preferably about 10° C./hr to about 100° C./hr, and more preferably about 30° C./hr to about 70° C./hr. Such a slow cooling or heating rate makes it possible to easily control the average particle diameter of the crystal fine particles in the copper halide.

Other than the production method described above, the desired blue-violet light blocking glass can also be obtained by, for example, spreading either or both copper ions and silver ions onto a glass substrate that does not contain either or both of the copper (I) halide component and silver component, so that the copper (I) halide component and silver component (at least one of the silver ions or silver compound) are formed in the glass substrate.

There are several methods for spreading either or both of the silver ions and copper ions onto a glass substrate. One example thereof is to form a film that contains a silver metal or silver compound (and/or copper metal or copper compound) on the surface of a glass substrate, followed by a heat treatment. Another example thereof is to dip a glass substrate in a molten silver salt and/or a copper salt in a vessel. The following explanations are mainly based on a method wherein copper ions are diffused.

Examples of methods for forming a film that contains a copper metal or copper compound on the surface of the glass substrate include, for example, a method wherein a copper compound-containing paste is applied and dried; a method wherein a film is formed by a sol gel process using a copper alkoxide solution; a vacuum deposition method; a CVD (chemical-vapor deposition) method, ion evaporation, sputtering, thermal spraying, etc.

The thickness of the film that contains a copper metal or copper compound can be suitably selected depending on the characteristics required for the desired blue-violet light blocking glass, but it is generally about 0.1 mm to about 2 mm.

The heat treatment after the formation of the film is performed at a temperature below the deformation point, for example, about 400° C. to about 700° C., for about 10 minutes to about 20 hours. Subsequently, the glass substrate is washed with water, so that a blue-violet light blocking glass having a copper halide crystal layer on the surface thereof is obtained.

Among the various methods previously mentioned, a method wherein a copper compound-containing paste is applied and then dried is explained below. There is no limitation to the copper compound-containing paste as long as it has a suitable viscosity for application to the surface of the glass substrate and contains a copper compound that allows copper ions to be diffused in the glass substrate by a heat treatment.

Examples of copper compounds include $CuSO_4$, $CuCl$, $CuCl_2$, $CuBr$, $CuBr_2$, $Cu_2O$, $CuO$, $Cu(NO_3)_2 \cdot 3H_2O$, $CuS$, etc. There is no limitation to the content of the copper compound in the paste, but it is generally about 20% by weight to about 70% by weight, and preferably about 30% by weight to about 60% by weight. The paste generally contains a binder component. It is preferable that a resin component, which can be easily decomposed by a heat treatment and readily removed by washing with water, be used as the paste.

Commercially available pastes for coloring glass can be used as the paste of the present invention. Usable pastes comprise, for example, 40% by weight to 60% by weight of copper sulfate, about 5% by weight to about 15% by weight of sodium sulfate, about 15% by weight to about 25% by weight of solvent, and about 1% by weight to about 5% by weight of a resin component.

There are no limitations to the conditions of the drying process conducted after applying the paste, but drying is generally conducted at a temperature of about 150° C. to about 300° C. for about 5 minutes to about 15 minutes.

The method comprising dipping a glass substrate in a vessel of copper salt can be performed in the following manner. A vessel containing a molten copper salt is heated to about 300° C. to about 700° C. but not exceeding the deformation point of the glass substrate, and the glass substrate is dipped therein for about 10 minutes to about 20 hours. Thereafter, the glass substrate is pulled out of the vessel, and then washed with water. By following such a procedure, copper ions are diffused in the glass substrate and a layer having fine crystals of a copper halide is formed on the surface of the glass substrate.

The copper compounds described above can also be used as the copper salt. As components other than copper salt, it is also possible to use a molten salt containing about 5% by weight to about 50% by weight of $NaNO_3$, $Na_2SO_4$, $NaCl$, etc., to facilitate the diffusion of the copper ions.

The silver ions can be diffused by using $AgNO_3$, $AgCl$, $AgBr$, $AgI$, $AgF$, $Ag_2S$, $Ag_2SO_4$, $Ag_2O$ and like silver compounds instead of the copper compound in the above-described procedure.

By diffusing either or both copper ions and silver ions, a copper (I) halide component and a silver component are formed in the glass substrate, so that the desired blue-violet light blocking glass can be obtained.

EFFECTS OF THE INVENTION

Because the blue-violet light blocking glass of the present invention contains silver in addition to copper (I) halide fine particles, it can satisfactorily transmit light having a wavelength of 450 nm to 600 nm, and sharply block light having a wavelength shorter than 450 nm. Specifically, in the preferred embodiments, when light having a wavelength of 300 nm to 600 nm is incident on a 1 mm-thick glass plate, the average transmittance of light having a wavelength from 450 nm to 600 nm was not less than 85%, and the wavelength having transmittance of 50% was not less than 432 nm. In other words, the blue-violet light blocking glass of the present invention has excellent transmittance for light having a wavelength of 450 nm to 600 nm and a sharp blocking effect (i.e., a narrow gradient wavelength range: Δλ) in the vicinity of 450 nm compared to prior art glass.

Because the blue-violet light blocking glass of the present invention does not require a cadmium compound, it is very safe and its production and disposal are easy.

BRIEF DESCRIPTION OF DRAWINGS

FIG. 1 shows the spectroscopic characteristics (relationship between wavelength and transmittance) of the glass substrates produced in Example 1, Example 3, Comparative Example 1 and Comparative Example 2.

FIG. 2 shows the spectroscopic characteristics (relationship between wavelength and transmittance) of the glass substrates produced in Example 2 and Comparative Example 1.

BEST MODE FOR CARRYING OUT THE INVENTION

The Examples are shown and the present invention is explained in detail below. However, the scope of the present invention is not limited to the Examples.

Examples 1 to 5 and Comparative Examples 1 and 2

The glass materials were weighed and mixed so that each glass contained the composition shown in Table 1.

Both Comparative Examples 1 and 2 used prior art glass, and are shown for reference (comparison) purposes.

Comparative Example 1 shows the case of using glass (not containing silver) in which copper (I) halide fine particles were dispersed.

In Comparative Example 2, glass in which Cds fine particles were dispersed was used.

The material mixture was melted, stirred and clarified in an alumina crucible at 1400° C. Subsequently, the molten material mixture was poured into a carbon mold and then cooled to room temperature at a rate of 40° C./hr. Thereafter, the mixture was heated at a rate of 50° C./hr and then heated at 630° C. for 45 minutes, followed by a subsequent heat treatment at 600° C. for 90 minutes.

Both the copper (I) halide fine particles and the =silver fine particles had an average particle diameter of 8 nm.

After the heat treatment, the resulting glass was cut and polished, obtaining a 1-mm-thick glass substrate.

TABLE 1

| Component (wt %) | Examples | | | | |
|---|---|---|---|---|---|
| | 1 | 2 | 3 | 4 | 5 |
| $SiO_2$ | 52.75 | 61.6 | 51.7 | 63 | 60 |
| $B_2O_3$ | 27 | 22 | 29 | 22 | 22 |
| $Al_2O_3$ | 2 | 2.7 | 2 | | 2.7 |
| $Li_2O$ | | | | 4.3 | |
| $Na_2O$ | 9 | 10.8 | 8 | 6.2 | 8.8 |
| $K_2O$ | 0.3 | 0.3 | 0.2 | | 2.2 |
| $Rb_2O$ | | | | | 0.1 |
| $Cs_2O$ | | | | | 0.1 |
| MgO | | | | | |
| CaO | | | | | 0.5 |
| SrO | | | | | 0.5 |
| BaO | 4 | | 4.3 | | |
| ZnO | 3 | 1 | 3.4 | 1 | |
| PbO | | | | | |
| $Nb_2O_5$ | | | | | |
| $ZrO_2$ | 0.5 | 0.5 | 0.5 | 0.5 | 0.5 |
| $La_2O_3$ | | | | | 0.1 |
| $Y_2O_3$ | | | | | |
| $Ta_2O_3$ | | | | | |
| $Gd_2O_3$ | | | | | |
| $Sb_2O_3$ | | | | | |
| $As_2O_3$ | | | | | |
| $SnO_2$ | 0.04 | 0.02 | 0.03 | | |
| CuCl | | | | 1.5 | |
| CuBr | 0.65 | 0.79 | 0.63 | | |
| CuI | 0.22 | 0.24 | 0.17 | | 2 |
| Ag | 0.04 | 0.04 | 0.07 | 1 | 0.5 |

Test Example 1

The spectroscopic characteristics of the glass plates of the Examples and Comparative Examples were examined.

Specifically, the transmittance of each wavelength was measured by irradiating the glass plate with light having a wavelength from 300 nm to 600 nm from a direction perpendicular to the surface of the plate.

FIGS. 1 and 2 are graphs showing the relationships between wavelength and transmittance (%) in the glass plates obtained in Examples 1 to 3 and Comparative Examples 1 and 2. Table 2 shows the average transmittance of light having a wavelength from 450 nm to 600 nm, Δλ, and the wavelength having a transmittance of 50%.

Although the results of the glass plates obtained in Examples 4 and 5 are not shown, the average transmittance of light having a wavelength from 450 nm to 600 nm was 90% and the Δλ was 10 nm.

From the results, it becomes clear that the glass (blue-violet light blocking glass) of the present invention has a high transmittance of light having a wavelength from 450 nm to 600 nm and has sharper blocking ability in the vicinity of 450 nm than prior art glass. The glass plates obtained in Comparative Examples 1 and 2 exhibit insufficient spectroscopic characteristics because the wavelength with a transmittance of 50% in the glass plate of Comparative Example 1 is relatively short, and the glass plate of Comparative Example 2 has a large Δλ.

TABLE 2

| | Average Transmittance of Light Having a Wavelength of 450 nm to 600 nm | Δλ | Wavelength at a Transmittance of 50% |
|---|---|---|---|
| Example 1 | 91% | 11 nm | 432.5 nm |
| Example 2 | 90% | 10 nm | 435 nm |
| Example 3 | 90.5% | 12 nm | 440 nm |
| Comparative Examples 1 | 90% | 9 nm | 429 nm |
| Comparative Examples 2 | 90% | 40 nm | 440 nm |

The invention claimed is:

1. A blue-violet light blocking glass comprising a copper (I) halide and silver, which further comprises 20 to 85% by weight of $SiO_2$; 2 to 75% by weight of $B_2O_3$; not more than 10% by weight of $Al_2O_3$; 2 to 30% by weight of at least one member selected from the group consisting of $Li_2O$, $Na_2O$, $K_2O$, $Rb_2O$ and $Cs_2O$; 1 to 15% by weight of at least one member selected from the group consisting of MgO, CaO, SrO, BaO and ZnO; not more than 10% by weight of at least one member selected from the group consisting of PbO, $Nb_2O_5$, $ZrO_2$, $La_2O_3$, $Y_2O_3$, $Ta_2O_3$ and $Gd_2O_3$; not more than 5% by weight of at least one member selected from the group consisting of $Sb_2O_3$ and $As_2O_3$; not more than 5% by weight of $SnO_2$; 0.01 to 10% by weight of a copper (I) halide; and 0.001 to 1% by weight of silver calculated on a metal basis.

2. A blue-violet light blocking glass comprising a copper (I) halide and silver, which further comprises 20 to 85% by weight of $SiO_2$; 2 to 75% by weight of $B_2O_3$; not more than 10% by weight of $Al_2O_3$; 2 to 30% by weight of at least one member selected from the group consisting of $Li_2O$, $Na_2O$, $K_2O$, $Rb_2O$ and $Cs_2O$; 1 to 15% by weight of at least one member selected from the group consisting of MgO, CaO, SrO, BaO and ZnO; not more than 10% by weight of at least one member selected from the group consisting of PbO, $Nb_2O_5$, $ZrO_2$, $La_2O_3$, $Y_2O_3$, $Ta_2O_3$ and $Gd_2O_3$; not more than 5% by weight of at least one member selected from the group consisting of $Sb_2O_3$ and $As_2O_3$; not more than 5% by weight of $SnO_2$; 0.005 to 7% by weight of CuBr and 0.005 to 7% by weight of CuI, whose total amount is 0.01 to 10% by weight; and 0.001 to 1% by weight of silver calculated on a metal basis.

3. A blue-violet light blocking glass comprising a copper (I) halide and silver, which further comprises 40 to 82% by weight of $SiO_2$; 12 to 52% by weight of $B_2O_3$; not more than 10% by weight of $Al_2O_3$; 2 to 20% by weight of at least one member selected from the group consisting of $Li_2O$, $Na_2O$, $K_2O$, $Rb_2O$ and $Cs_2O$; 1 to 15% by weight of at least one member selected from the group consisting of MgO, CaO, SrO, BaO and ZnO; not more than 10% by weight of at least one member selected from the group consisting of PbO, $Nb_2O_5$, $ZrO_2$, $La_2O_3$, $Y_2O_3$, $Ta_2O_3$ and $Gd_2O_3$; not more than 5% by weight of at least one member selected from the group consisting of $Sb_2O_3$ and $As_2O_3$; not more than 5% by weight of $SnO_2$; 0.01 to 10% by weight of at least one member selected from the group consisting of CuCl, CuBr and CuI; and 0.01 to 1% by weight of silver calculated on a metal basis.

4. A blue-violet light blocking glass comprising a copper (I) halide and silver, which further comprises 40 to 82% by weight of $SiO_2$; 12 to 52% by weight of $B_2O_3$; not more than 10% by weight of $Al_2O_3$; 2 to 20% by weight of at least one member selected from the group consisting of $Li_2O$, $Na_2O$, $K_2O$, $Rb_2O$ and $Cs_2O$; 1 to 15% by weight of at least one member selected from the group consisting of MgO, CaO, SrO, BaO and ZnO; not more than 10% by weight of at least one member selected from the group consisting of PbO, $Nb_2O_5$, $ZrO_2$, $La_2O_3$, $Y_2O_3$, $Ta_2O_3$ and $Gd_2O_3$; not more than 5% by weight of at least one member selected from the group consisting of $Sb_2O_3$ and $As_2O_3$; not more than 5% by weight of $SnO_2$; 0.005 to 7% by weight of CuBr and 0.005 to 7% by weight CuI, whose total amount is 0.01 to 10% by weight; and 0.01 to 1% by weight of silver calculated on a metal basis.

5. A blue-violet light blocking glass according to claim 1, which further comprises:
a glass substrate containing 1) $SiO_2$; 2) $B_2O_3$; 3) $Al_2O_3$; 4) at least one member selected from the group consisting of $Li_2O$, $Na_2O$, $K_2O$, $Rb_2O$ and $Cs_2O$; 5) at least one member selected from the group consisting of MgO, CaO, SrO, BaO and ZnO; 6) at least one member selected from the group consisting of PbO, $Nb_2O_5$, $ZrO_2$, $La_2O_3$, $Y_2O_3$, $Ta_2O_3$ and $Gd_2O_3$; 7) at least one member selected from the group consisting of $Sb_2O_3$ and $As_2O_3$; 8) $SnO_2$; 9) a copper (I) halide; and
at least one member selected from the group consisting of silver ions and silver compounds formed in the glass substrate by diffusing silver ions.

6. A blue-violet light blocking glass according to claim 2, which further comprises:
a glass substrate containing 1) $SiO_2$; 2) $B_2O_3$; 3) $Al_2O_3$; 4) at least one member selected from the group consisting of $Li_2O$, $Na_2O$, $K_2O$, $Rb_2O$ and $Cs_2O$; 5) at least one member selected from the group consisting of MgO, CaO, SrO, BaO and ZnO; 6) at least one member selected from the group consisting of PbO, $Nb_2O_5$, $ZrO_2$, $La_2O_3$, $Y_2O_3$, $Ta_2O_3$ and $Gd_2O_3$; 7) at least one member selected from the group consisting of $Sb_2O_3$ and $As_2O_3$; 8) $SnO_2$; 9) CuBr and CuI; and
at least one member selected from the group consisting of silver ions and silver compounds formed in the glass substrate by diffusing silver ions.

7. A blue-violet light blocking glass according to claim 3, which further comprises:
a glass substrate containing 1) $SiO_2$; 2) $B_2O_3$; 3) $Al_2O_3$; 4) at least one member selected from the group consisting of $Li_2O$, $Na_2O$, $K_2O$, $Rb_2O$ and $Cs_2O$; 5) at least one member selected from the group consisting of MgO, CaO, SrO, BaO and ZnO; 6) at least one member selected from the group consisting of PbO, $Nb_2O_5$, $ZrO_2$, $La_2O_3$, $Y_2O_3$, $Ta_2O_3$ and $Gd_2O_3$; 7) at least one member selected from the group consisting of $Sb_2O_3$ and $As_2O_3$; 8) $SnO_2$; 9) at least one member selected from the group consisting of Cl, Br and I; 10) 0.01 to 1% by weight of silver calculated on a metal basis; and at least one copper (I) halide selected from the group consisting of CuCl, CuBr and CuI formed in the glass substrate by diffusing copper ions.

8. A blue-violet light blocking glass according to claim 4, which further comprises:
a glass substrate containing 1) $SiO_2$; 2) $B_2O_3$; 3) $Al_2O_3$; 4) at least one member selected from the group consisting of $Li_2O$, $Na_2O$, $K_2O$, $Rb_2O$ and $Cs_2O$; 5) at least one member selected from the group consisting of MgO, CaO, SrO, BaO and ZnO; 6) at least one member selected from the group consisting of PbO, $Nb_2O_5$, $ZrO_2$, $La_2O_3$, $Y_2O_3$, $Ta_2O_3$ and $Gd_2O_3$; 7) at least one member selected from the group consisting of $Sb_2O_3$ and $As_2O_3$; 7) $SnO_2$; 8) Br and I; 9) 0.01 to 1% by weight of silver calculated on a metal basis; and
CuBr and CuI in the glass substrate formed by diffusing copper ions in the glass substrate.

9. A blue-violet light blocking glass according to claim 3, which further comprises:
a glass substrate containing 1) $SiO_2$; 2) $B_2O_3$; 3) $Al_2O_3$; 4) at least one member selected from the group consisting of $Li_2O$, $Na_2O$, $K_2O$, $Rb_2O$ and $Cs_2O$; 5) at least one member selected from the group consisting of MgO, CaO, SrO, BaO and ZnO; 6) at least one member selected from the group consisting of PbO, $Nb_2O_5$, $ZrO_2$, $La_2O_3$, $Y_2O_3$, $Ta_2O_3$ and $Gd_2O_3$; 7) at least one member selected from the group consisting of $Sb_2O_3$ and $As_2O_3$; 8) $SnO_2$; 9) at least one member selected from the group consisting of Cl, Br and I; and
at least one member selected from the group consisting of silver ions and silver compounds and at least one copper (I) halide selected from the group consisting of CuCl, CuBr and CuI obtained by diffusing silver ions and copper ions into the glass substrate.

10. A blue-violet light blocking glass according to claim 4, which further comprises:
a glass substrate containing 1) $SiO_2$; 2) $B_2O_3$; 3) $Al_2O_3$; 4) at least one member selected from the group consisting of $Li_2O$, $Na_2O$, $K_2O$, $Rb_2O$ and $Cs_2O$; 5) at least one member selected from the group consisting of MgO, CaO, SrO, BaO and ZnO; 6) at least one member selected from the group consisting of PbO, $Nb_2O_5$, $ZrO_2$, $La_2O_3$, $Y_2O_3$, $Ta_2O_3$ and $Gd_2O_3$; 7) at least one member selected from the group consisting of $Sb_2O_3$ and $As_2O_3$; 7) $SnO_2$; 8) Br and I; and
at least one member selected from the group consisting of silver ions and silver compounds, and at least one copper (I) halide selected from the group consisting of CuCl, CuBr and CuI obtained by diffusing silver ions and copper ions in the glass substrate.

11. A blue-violet light blocking glass according to claim 1, wherein when light having a wavelength of 300 nm to 600 nm is incident in the glass having a thickness of 1 mm, the average transmittance of light having a wavelength of 450 nm to 600 nm is not less than 85%, and the wavelength that achieves a transmittance of 50% is not less than 432 nm.

12. A blue-violet light blocking glass according to claim 1, further comprising a liquid crystal display attached to the glass.

13. A blue-violet light blocking glass according to claim 1, which is in the shape of a pane of window glass.

14. A blue-violet light blocking glass according to claim 1, which is in the shape of an optical filter, a light filter or a lens.

15. A blue-violet light blocking glass according to claim 1, which is in the shape of an eyeglass lens.

16. A blue-violet light blocking glass according to claim 1, which is in the form of a powder.

* * * * *